March 17, 1936.　　　J. F. PAGENDARM　　　2,034,414
SWITCH
Filed Jan. 6, 1932　　　2 Sheets-Sheet 1

Inventor:
John F. Pagendarm
By Brown, Jackson, Boettcher & Dienner
Attys.

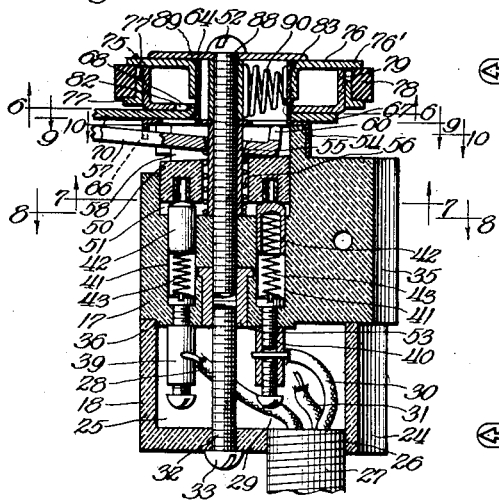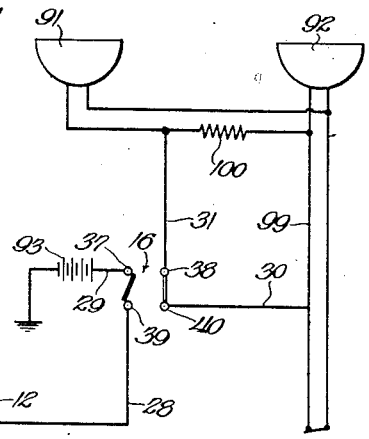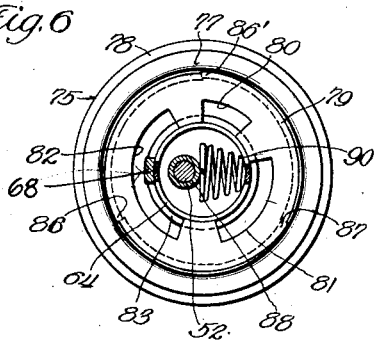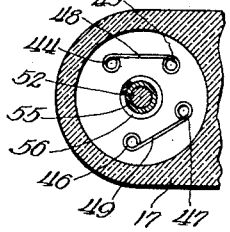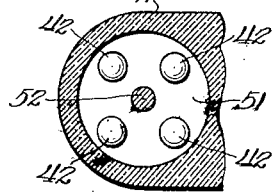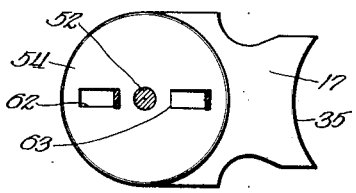

Patented Mar. 17, 1936

2,034,414

UNITED STATES PATENT OFFICE 2,034,414

SWITCH

John F. Pagendarm, San Francisco, Calif., assignor to Neon Arrowlite, Inc., Salt Lake City, Utah, a corporation of Utah Application January 6, 1932, Serial No. 584,985

15 Claims. (Cl. 200—59)

This invention relates to switches, and more particularly to switches of the type adapted to be mounted within a vehicle for the purpose of operating direction-indicating signals.

The invention is especially directed to a switch adapted to be mounted upon the steering post of a vehicle immediately below the steering wheel, and is adapted to be engaged manually, but may be disengaged either manually or automatically.

It has been observed that in the provision of a signalling indication for indicating a right or left turn, the control for the signal has generally been actuated by either the steering wheel or the parts actuated thereby. This actuation, therefore, only occurs upon the initiation of the turning operation. The result is that the signal is ineffective, because it occurs at the instant the turn is being made, and gives no adequate indication of the contemplation of a turn.

It is desirable that the intention of making a turn be indicated to following vehicles in order that they may not attempt to pass the vehicle making the turn and in order to permit the following vehicles to slow down, if necessary. It is also advisable to give an indication to oncoming traffic that a turn is contemplated. Therefore, it is essential that the signal be given a considerable distance before the turn is commenced. Thus it is necessary that the control be manually operated to signal the intention of making a turn.

Upon completion of the turn, the signal should be restored to its non-indicating position. This should preferably be accomplished automatically so that it will not be left to the operator of the vehicle to restore the signal to its non-indicating position upon the completion of the turn. However, it is also necessary that some means be provided so that the operator may manually restore the signal to its non-indicating position independently of the steering mechanism of the vehicle, in the event that the operator, having once given the signal for turning, changes his mind before making the turn and desires to continue in the same direction in which he was formerly proceeding.

It is therefore an object of the present invention to provide an improved switch whereby the above action may be obtained in a simple and reliable manner.

It is also an object of the present invention to provide a signal circuit connected with the switch and so arranged that the intention of turning can be indicated to oncoming traffic as well as to following vehicles, and that a portion of the signalling indications are at all times visible to the operator of the vehicle so that he will know that the signals are operating properly.

The switch of the present invention is also adapted to be mounted upon various types of steering posts, and is provided with means whereby the steering wheel may be slightly turned in a direction opposite to the direction in which the turn is to be made, as some operators swing outwardly before turning. Some of the older types of vehicles have steering wheels which turn the front wheels thereof much more quickly than the newer types of steering wheels. With the means provided in the present switch, it may be adapted readily to any steering wheel so that it will restore the signal to the non-indicating position at the proper time.

In order that those skilled in the art may more readily understand the construction and operation of my novel switch, I shall now describe it in detail in connection with the accompanying drawings, in which:

Figure 4 is a sectional elevational view taken substantially on the line 4—4 of Figure 3;

Figure 5 is a diagrammatic circuit diagram of the electrical connections in my signalling system;

Figure 6 is a view taken substantially on the line 6—6 of Figure 4;

Figure 7 is a view taken on the line 7—7 of Figure 4 showing the arrangement of the contacts operated by the switch lever;

Figure 8 is a view taken on the line 8—8 of Figure 4 showing the contacts leading to the circuit connections;

Figure 9 is a view taken on the line 9—9 of Figure 4 showing the cover plate which fits over the top of the switch lever;

Figure 10 is a sectional view taken on the line 10—10 of Figure 4 showing the positioning of the switch lever within the housing.

Figure 1:
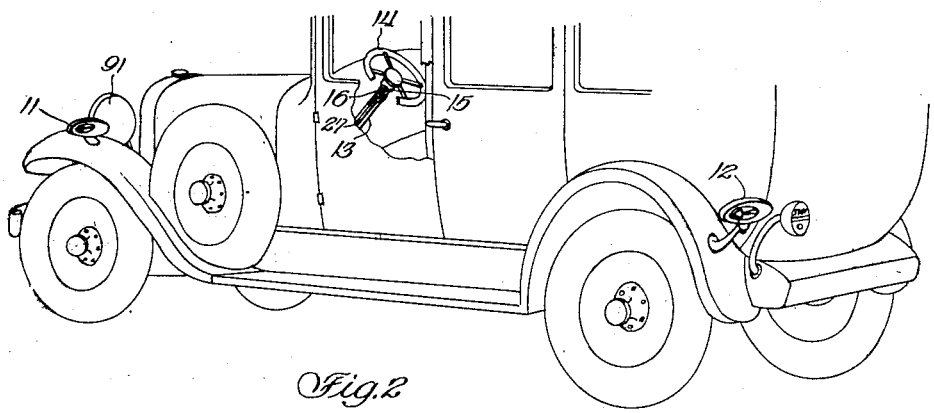
Figure 1 is a partial perspective view of an automobile embodying my novel switch and signalling system with a part broken away to show the mounting of the switch upon the steering post.

Referring in more detail to the drawings, the automobile shown in Figure 1 is provided with a front and a rear signal, indicated respectively at 11 and 12, which signals are mounted rigidly upon the fenders or other exposed portion of the vehicle in such manner that they are clearly visible to vehicles following the vehicle shown in Figure 1. The signal mounted upon the front fender, indicated at 11, is provided with two openings,—one at the front and one at the rear,—so that the signal is visible to oncoming traffic and also to the operator of the vehicle so that he will at all times know whether the signal is operating properly or not. The signal 12 is provided with an opening only in its rear portion so that both the front and rear signals may be readily observed by drivers from the rear, and the front signal may be observed by drivers coming toward the vehicle carrying the signal.

Within the vehicle is positioned the usual steering post 13, carrying the steering rod and having the steering wheel 14 adapted to be positioned upon the upper end of the post and engaging the post by means of the flanged hub portion 15. Mounted on the steering post immediately below the wheel 14 is the switch of my invention, designated generally by the numeral 16.

The switch 16 is composed of two insulating housing members 17 and 18, the housing member 17 being formed with a pair of arcuate-shaped grooves for accommodating a strap of metal 19 adapted to fit around the post 13 and which is held in frictional engagement in the grooves formed in the housing 17 by means of a bolt 20 provided with two semi-cylindrical members 21 and 22 adapted to be forced into abutting contact with the outer surface of the strap and forcing the strap into the arcuate grooves. The strap has a longitudinal slot 23 formed therein for providing means to adjust the length of the strap so that it may be secured around various sizes of posts. The lugs 21 and 22 may be formed by cutting a cylindrical member into two semi-cylindrical members and the lug 21 has an opening formed therein which is slightly larger than the diameter of the stem of the bolt 20 and is freely slidable upon the bolt. The lug 22 is threaded to cooperate with the threads carried by the bolt 20 and is drawn into engagement upon rotation of the bolt to secure the strap in any desired position, depending upon the diameter of the post 13.

The substantially cylindrical housing 18 has an arcuate portion formed on one surface thereof which is adapted to fit around the rounded portion of the post 13, as indicated at 24. As shown in Figure 4, this housing is provided with an internal recessed portion 25 and has an outlet opening 26 formed therein which is adapted to engage a suitable conduit member 27. This conduit member 27 may be formed of armored cable, flexible conduit or the like, and provides a conduit means for leading the conductors 28, 29, 30, and 31 into the recessed portion 25 of the housing 18.

Disposed within a suitable opening formed in the housing 18 is a bolt 32 adapted to be passed therethrough and having the head 33 in abutting contact with the under surface of the housing 18. This bolt 32 is adapted to be threaded into a suitable metallic sleeve member provided in the housing 17 for the purpose of rigidly securing the housing 18 to the housing 17.

Referring now to the housing 17, this housing is provided with an arcuate portion 35 adapted to fit around the post 13 to hold the housing 17 firmly in engagement with the post. Both the housing 17 and the housing 18 may be formed of wood or similar material moulded to shape. It is conceivable that these housings might be formed from moulded condensation products. The housing 17 is provided with a depending portion 36 adapted to fit around the periphery of the recess in the housing 18 so as to lock the housings 17 and 18 in rigid contacting relation.

Projecting through this depending portion are the four contact members 37 to 40, inclusive. These contact members may be of any suitable type, and in the embodiment shown are formed of a pair of screw members threaded into a cylindrical sleeve portion and adapted to engage the respective ends of the conductors 28 to 31, inclusive, these conductors passing through cooperating openings formed in the sleeve member and being tightly engaged by means of the bottom screw member which is threaded upwardly into abutting engagement with the conductors.

The upper end of the conductors 37 to 40, inclusive, terminate in cylindrical recessed portions of the housing 17, there being one recessed portion for each of the conductors 37 to 40, inclusive. These recessed portions are indicated by the reference numeral 41, and are all identical. A contact cap member 42 is provided for each of the conductors and is preferably formed with a hollow cylindrical portion adapted to receive one end of a spring 43, the other end of the spring bearing against the tops of each of the conductors 37 to 40. This construction is identical for each of the conductors 37 to 40 and the four cap members are all designated by the reference numeral 42.

The spring members 43 are adapted to urge the conductor caps 42 upwardly into contact with the switch points 44 to 47, inclusive. These switch points, as shown in Figure 7, are connected in pairs, the switch points 44 and 45 being connected together by means of the metallic strip 48 and the switch points 46 and 47 being connected together by the metallic strip 49. These switch points may preferably be formed of a single strip of metal having its ends curled to provide the respective switch points. The strips of metal are embedded in a suitable switch housing 50 which fits into a cylindrical recess 51 provided in the upper portion of the housing 17.

The housing 17 is provided with a centrally located opening adapted to receive the threaded bolt 52. This bolt 52 is adapted to thread into a metallic sleeve member 53 formed integral with or moulded into the housing 17. This sleeve member is the sleeve member which receives at its other end the bolt 32 attached to the housing 18.

The housing 17 is provided with an upwardly flanged portion defining the periphery of the recessed portion 51 thereof, this upwardly flanged portion being adapted to receive a cup-shaped cover member which has a central opening formed therein for receiving the bolt 52. Surrounding the bolt 52 and extending from the lower side of the cover member 54 to the bottom of the recess 51 is a cylindrical sleeve member 55 which forms an outer bearing surface for the bolt 52.

The switch housing 50 is provided with an enlarged central opening adapted to fit around the bolt 52 and associated sleeve member 55 and a spring 56 is positioned between the sleeve member 55 and the housing 50. This spring member seats at its lower end upon the bottom of the recess 51 and extends upwardly into contact with a switch arm 57 which is adapted to be operated for actuating the switch.

Referring to Figure 10, the switch housing 50 is provided with a slotted portion extending diametrically thereof as indicated by the reference numeral 58. The switch arm 57 has an enlarged portion adapted to fit snugly into this slotted portion of the housing 50 and is provided with an upturned end 59 having the two projecting ears 60 formed thereon for engaging the under side of the cover member 54. The switch arm 57 has a cut-out portion adapted to fit around the collar 55 and to move about this collar as a pivot point, this portion comprising an elongated aperture providing free rocking movement about the pivot.

With reference now to Figure 9, the switch cover is indicated at 54. In addition to having the central opening for receiving the bolt 52, the member 54 has two rectangular slots 62 and 63 formed therein and adapted to be aligned longitudinally of the housing 17. These slots are adapted to receive corresponding projecting ears formed on a collar member 64 disposed about the upper part of the bolt 52.

As shown in Figures 4 and 10, the switch cover member 54 has a cut-away portion of the depending flange which is provided to accommodate the extending switch arm 57, this cut-away portion being formed by turning in the flanged depending portions of the cage member 54 and by providing a slotted tongue portion therein, indicated at 66, this slotted portion being adapted to receive the narrowed throat portion of the switch arm 57 to lock the same when the switch is in the off position, due to the pressure of the spring 56 urging the switch upwardly.

Mounted on the top of the cover member 54, is a flat horizontally extending plate member 67 provided with a circular opening adapted to receive the lower circular edge of the collar member 64 and having a relatively tight fit therewith. One portion of this member 67 has an upwardly projecting lip portion 68 which will be described more in detail later.

Figure 2:
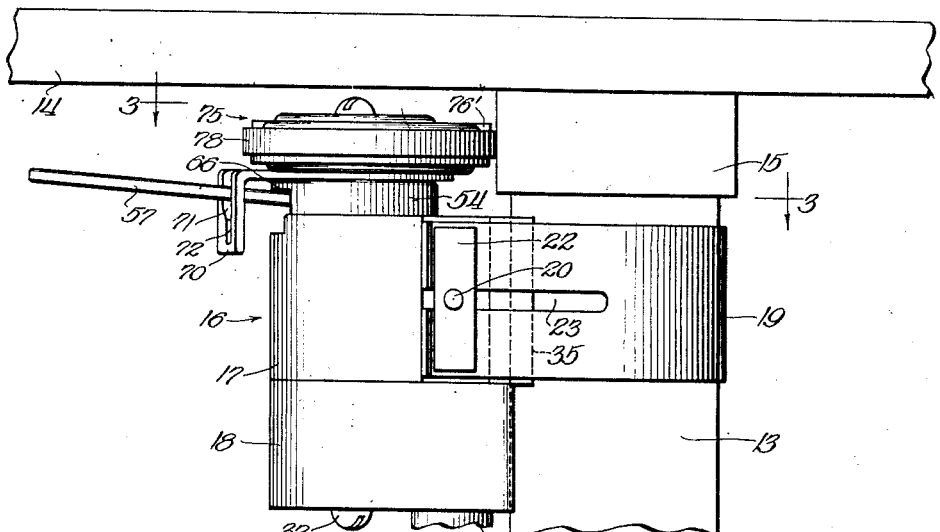
Figure 2 is an elevational view of the switch mounted in operative position.

The outwardly extending portion of the member 67 is provided with a depending cage portion 70 adapted to fit around the switch arm 57. This cage portion 70 is provided with a tapered or diagonal portion 71 on its lefthand side as viewed in Figure 2, and is provided with a relatively straight vertical portion 72 on its righthand side, as viewed in the same figure, although this construction may be modified.

Surmounting the member 67 is a friction member, indicated generally by the reference numeral 75, which is composed of a friction housing 76 provided with an outwardly flanged portion 77 adapted to support a friction ring 78 formed of rubber, fiber, or some other suitable friction material. This ring 78 is adapted to have frictional contact with the hub 15 of the steering wheel 14 and is adapted to be rotated thereby. Suitable ears 76' are struck out of the vertically extending portion 77' of the flange 77, and serve to secure the friction member 78 in position. A cup-shaped member 79 is positioned in frictional contact with the inner portion of the housing 76 and is provided with a central opening adapted to receive the collar 64. This cup-shaped element 79 is also provided with three arcuately-shaped notches or slots 80, 81, and 82, these notches being adapted to be engaged by the upturned ear or tip portion 68 of the member 67. The purpose of the three differently sized notches 80, 81, and 82 will be explained later.

The housing member 76 has the depending flange portion 83 defining the inner circumference thereof and adapted to have frictional contact with the outer periphery of the collar 64. A plurality of spring fingers 86, 86' and 87 are struck out of the cup-shaped member 79 and have frictional engagement with the flanged portion 77' of the housing 76. These spring members serve to frictionally hold the member 79 in rotating engagement with the member 76, and possess sufficient strength so that upon rotation of the friction member 75, the cup-shaped element 79 will rotate therewith, the upwardly projecting lip portion 68 of the member 67 sliding in one of the notches 80, 81 or 82 provided in the member 79.

Disposed about the bolt 52 is a second collar member 88, extending from the top of the cover member 54 to the top of the collar 64, there being a washer 89 provided about the upper head of the bolt 52 to cover the opening formed within the collar 64.

A helical spring member 90 is positioned in abutting contact with the collar member 88, and at its other end is engaged in a suitable opening formed in the collar 64 for urging the collar and the associated friction assembly 75 inwardly against the hub portion 15 of the wheel 14. This results in an off-center mounting of the friction assembly 75 with respect to the bolt 52, but maintains a firm frictional contact and prevents slipping of the friction element 78 when the hub 15 is rotated.

Referring now to the circuit diagram shown in Figure 5, the pair of head lamps usually provided for a vehicle are indicated by the numerals 91 and 92. A suitable source of energy, such as a battery, is indicated at 93 and leads through conductor 29 to the contact member 37. Leading from the contact member 37 by means of the pair of contacts 46 and 47, to the contact member 39, and thence to the signal indicators 11 and 12, is a suitable conductor 28 adapted to energize the signal 12 and to be then led into the signal 11 and grounded therein. The circuit for controlling the head lamps of the vehicle is indicated generally at 94, and comprises the ignition switch 95 adapted to close the two main feed lines 96 and 97. The feed line 97 leads directly to the head lamps 91 and 92, respectively. The feed line 96 has a by-pass conductor 30 adapted to lead to the contact member 40 and by means of the switch points 44 and 45, and the communicating strip of metal 48, the current flows from the conductor 98 through the contact 40 to the contact 38. From the contact 38 the current flows through conductor 31 to the head lamp 91. A second line 99 leads from the feed line 96 directly to the head lamp 92.

A suitable impedance coil, preferably a resistance coil or a dimmer coil, is positioned between the feed line 99 and the connection to the head lamp 91. It is therefore evident that upon breaking of the contact between the contact points 38 and 40, that current will flow through the feed line 96 and 99 and hence through the resistance 100 to the head lamp 91, causing this head lamp to become dimmed. The head lamp 92 will not be affected by the breaking of the circuit from the switch point 40 to the switch point 38.

In the operation of my novel switching means, the switch arm 57 is depressed until the narrowed portion thereof is forced below the depending slotted portion 66 of the switch cover member 54. The switch is manually rotated in a clockwise direction, until the narrowed portion thereof comes into engagement with the curled end portion 101 (Fig. 10) of the member 54. This rotation of the switch arm causes the connection between the contacts 38 and 40 to be broken, and causes a connection to be established between the points 37 and 39. This results in the left head lamp 91 being dimmed, and in actuation of the signals 11 and 12.

It is to be noted that when the switch is in its off position, that is, when the narrowed portion of the switch arm 57 is engaged in the slot 66, the contact will be so arranged that the switch point 44 will be resting upon the metallic cap 42 connected to the contact 40 and the switch point 45 will be resting upon the metallic cap 42 connected to the contact 38. The switch point 46 will not be engaged with any of the metallic caps 42, and the connecting strip 49 between the contact switch points 46 and 47 will be engaged by the metallic cap 42 connected to the contact 37. Upon rotation of the switch and consequent rotation of the switch housing 50, the contacts will be so moved that contact cap 42 connected to contact 39 will be abutting against switch point 46, whereas contact 37 will be connected to switch point 47 by means of the metallic cap 42. Switch point 45 will have been moved away from contact with the metallic cap connected to the contact 38, and the intermediate strip of metal 48 will be resting on the metallic cap 42 connected to the contact 40. Thus the connection between the contacts 38 and 40 will be broken, and connection between contacts 37 and 39 will be established. It is thus seen that upon rotation of the switch, the signals will be energized, and the left head lamp will be dimmed.

Figure 3:
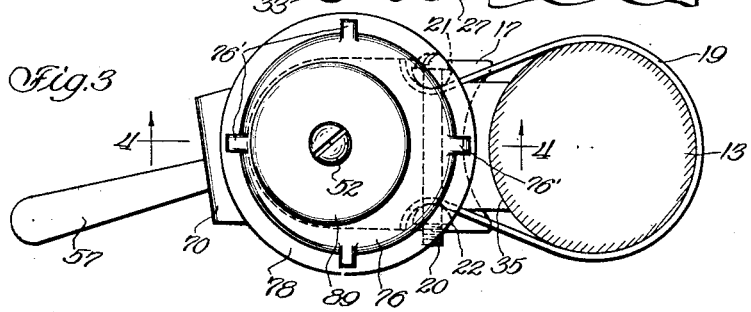
Figure 3 is a sectional view taken substantially on the line 3—3 of Figure 2, looking in the direction of the arrows.

Assuming, for example, that a left turn is to be made, and that the signals 11 and 12 are mounted upon the lefthand fenders of the vehicle, as illustrated in Figure 1, the switch being mounted on the lefthand side of the steering post, the switch lever 57 will be manually depressed and rotated to cause actuation of the direction indicators 11 and 12 and dimming of the left front headlamp 91, and the wheel 14 will then be rotated in a counterclockwise direction. This results in the hub 15 of the wheel frictionally engaging the member 78 of the friction assembly, and rotating this member in a clockwise direction, as viewed in Figure 3. This results in the cage member 70 abutting against the switch arm 57 and forcing the switch arm over to its furthermost "on" position, represented as the point where the arm comes in contact with the curled end 101 of the cover member 54.

Further rotation at this point results in the friction housing 76 sliding about the collar 64, and also sliding about the cup-shaped housing 79, inasmuch as this housing is held in fixed position because of the engagement of the lip 68 in one of the notches 80, 81 or 82.

As the turn is being completed, the wheel 14 is rotated in a clockwise direction, resulting in the friction assembly 75 now rotating in a counterclockwise direction. This results in the member 79 sliding about the lip 68 until the contacting edge of one of the notches 80, 81 or 82 engages with the lip portion 68 of the member 67. As this occurs, the portion 71 of the cage 70 engages the switch arm 57 and any further rotation causes the member 67, together with the cage 70 and the friction assembly 75 to rotate in a counter-clockwise direction, causing the switch arm 57 to be forced in a counter-clockwise direction until the switch arm reaches its off position, whereupon the spring member 56 will force the arm up into engagement with the slot 66 provided in the cage member 54.

It is thus apparent that the switch is automatically disengaged upon completion of the turn and therefore the operator of the vehicle does not have to bother with the question of disengaging the switch manually. As the switch is disengaged, the connection between contacts 37 and 39 is again broken, extinguishing the direction indicators 11 and 12, and the connection between the contacts 38 and 40 is reestablished, causing the full current to reach the headlamp 91.

Referring now more specifically to the provision of the three arcuate notches 80, 81, and 82, it will be observed that these notches are of different arcuate length, and in assembling the switch the projecting lip 68 can be positioned within any one of the three notches. The notch selected depends upon the ratio of turning between the wheels of the vehicle and the steering wheel 14. Upon some of the older models of vehicles, a relatively short movement of the wheel 14 was sufficient to turn the dirigible wheels of the vehicle, and as a result the projecting lip 68 could be engaged in the notch 80 so that upon a relatively slight return movement of the wheel 14 after completion of the turn, the signal will be extinguished.

In some of the later types of vehicles, the ratio is much larger, and it is desired that the switch shall not be disengaged upon a small amount of movement of the wheel 14 in a clockwise direction. For instance, some operators of vehicles desire to swing slightly to the right before making a lefthand turn. In case the lip 68 was engaged in the notch 80, the switch might be shut off at the start of this small swing to the right, and therefore would give no indication of the turning of the vehicle. It is to prevent such an occurrence that the larger notches 81 and 82 are provided, inasmuch as a small amount of rotation of the wheel 14 in a clockwise direction will merely cause the lip 68 to engage the notches 81 or 82 from one end to the other end thereof without disengaging the switch. It is thus possible to adapt the switch to any model of vehicle, and to provide means so that the switch will function regardless of the individual characteristics of the operator.

It is also desirable, in a switch of this type, to provide means so that the switch may be manually disengaged, in the event that a contemplated turn is not made. The switch of the present invention may be disengaged manually by merely moving the switch arm from its "on" position to its "off" position, the movement being accomplished because of the sliding frictional engagement of the cup-shaped member 79 within the housing 76.

It is also apparent, that by the provision of the spring 90 for urging the friction assembly 75 into an off center position with respect to the bolt 52, that the engagement between the hub 15 and the friction element 78 will be at all times such that there will be no slippage therebetween. In the event that the friction element 78 should become badly worn, it is an easy matter to slip this element, which is in the form of a ring forced down over the outer portion of the housing 76, and held in position by the ears 76', off of the housing and to replace it by a new friction element. Since the adjustment is variable, because of the spring 90, the element 78 can be used regardless of its thickness, and therefore a relatively thick friction element, capable of sustained usage, can be employed.

It is to be noted that the projecting ears 60 of the switch arm 57 at no time come into contact with the slots 63 formed in the cage member 54. These ears are provided for the purpose of giving the switch arm 57 an upwardly extending direction, due to the fact that the spring 56 forces the arm normally upwardly, and the ears 60 prevent the inner end of the arm from moving upwardly, therefore forcing the outer end of the arm 57 upwardly into engagement with the slot 66.

If desired, the cage 70 provided at the end of the member 67 can be positioned outwardly at a point more distant from the housing 17, to give the cage 70 more leverage in returning the switch arm 57 to its off position. This, however, is merely a matter of design and is optional in the embodiment shown. It is to be understood, however, that the spring fingers 86, 86' and 87 are of sufficient strength so that the cup-shaped member 79 will move with the housing 76 at all times except when the wheel 14 is rotated in a counterclockwise direction farther than can be accommodated by the lip 68 in one of the notches 80, 81 or 82. After this point is reached, the housing 79 will remain stationary and the housing 76 will rotate thereabout. However, upon return movement of the housing 76, as soon as the lip 68 engages with the other end of one of the notches 80, 81 or 82, the member 67 will be rotated by the housing 79 moving in conjunction with the housing 76 and will return the switch arm 57 to its off position.

While I have shown and described my invention in connection with a specific embodiment of the same, I do not intend to be limited to the specific details shown and described, but only insofar as defined by the spirit and scope of the appended claims.

I claim:

1. In a switch adapted to be mounted on the steering post of a vehicle, a switch arm, friction means for returning said switch arm to normal position after operation thereof, comprising a friction ring engaged by a steering wheel hub, a housing supporting said ring, a second housing disposed within said first housing, spring means urging said housings into frictional engagement therebetween, means for urging said housings toward said steering wheel hub, a cage member positioned about said switch arm and extending into coaxial engagement with said housings, an extending lip portion on said cage member, notches formed in said second housing, said lip portion being adapted to be engaged by said notches upon rotaton of said friction means to return said switch arm to normal position.

2. In a switch adapted to be mounted on the steering post of a vehicle, a switch arm, friction means for returning said switch arm to normal position after operation thereof, comprising a friction ring engaged by a steering wheel hub, a cup-shaped housing having an outwardly extending flange for supporting said ring, a second housing disposed within said first housing, spring means integral with said second housing for urging said housings into frictional engagement therebetween, means for urging said housings toward said steering wheel hub, a cage member positioned about said switch arm and extending into coaxial alignment with said housings, an extending lip portion on said cage member, notches formed in the bottom surface of said second housing, said lip portion being adapted to be engaged in said notches upon rotation of said friction means to return said switch arm to normal position.

3. In a switch adapted to be mounted on the steering post of a vehicle, a switch arm, friction means for returning said switch arm to normal position after operation thereof, comprising a friction ring engaged by a steering wheel hub, a housing supporting said ring, a plate secured over said housing and preventing displacement of said ring, a second housing disposed within said first housing, spring means urging said housings into frictional engagement therebetween, a collar within said housings, means for urging said collar and housings toward said steering wheel hub, a cage member about said switch arm and extending into coaxial engagement with said collar, an extending lip portion on said cage member, notches formed in said second housing, said lip portion being adapted to be engaged in said notches upon rotation of said friction means to return said switch arm to normal position.

4. In combination, in a switch adapted to be mounted on the steering post of a vehicle, a switch arm, friction means for returning said switch arm to normal position, comprising a friction ring engaged by a steering wheel hub, a housing supporting said ring, a second housing disposed within said first housing, integral spring members on said second housing for causing cooperative movement of said housings, a cage member positioned about said switch arm and extending into coaxial engagement with said housings, an extending lip portion projecting upwardly from said cage member, said housings and cage member being shiftable normal to the axis of said post, a plurality of notches formed in the bottom surface of said second housing, said lip portion being engaged in one of said notches whereby rotation of said friction means returns said switch arm to normal position.

5. In combination, a switch adapted to be mounted on the steering post of a vehicle, a switch arm, friction means coaxial therewith, comprising a friction ring engaged by said steering post, a housing supporting said ring, a second housing disposed within said first housing, means for urging said housings into cooperating frictional engagement, a cage member positioned about said switch arm and extending into coaxial engagement with said housings, an extending lip portion projecting upwardly from said cage member, a plurality of notches formed in the bottom surface of said second housing, said notches being of varying arcuate length, said lip portion being adapted to be engaged by one of said notches upon rotation of said friction means to return said switch arm to normal position.

6. In a switch adapted to be mounted on the steering post of a vehicle, a switch arm, friction means for returning said switch arm to normal position, comprising a friction ring engaged by said steering post, a housing supporting said ring, a second housing disposed within said first housing, resilient means normally causing said housings to rotate together, a cage member positioned about said switch arm and extending into coaxial alignment with said housings, an extending lip portion projecting upwardly from said cage member, a plurality of notches formed in the bottom surface of said second housing, said notches being of varying arcuate length, said lip portion being adapted to be engaged in any one of said notches whereby upon rotation of said friction means said cage member will return said switch arm to normal position.

7. In combination, in a switch adapted to be mounted on the steering post of a vehicle, a switch arm, friction means coaxial therewith, comprising a friction ring engaged by said steering post, a housing supporting said ring, a second housing disposed within said first housing, resilient means for urging said housings normally into frictional engagement, a cage member positioned about said switch arm and extending into coaxial alignment with said housings, an extending lip portion projecting upwardly from said cage member, a plurality of notches formed in the bottom surface of said second housing, said notches being of varying arcuate length, said lip portion being adapted to be engaged in one of said notches, the notch selected depending upon the amount of rotation desired in said friction means before the return of said switch arm to normal position.

8. The combination with a vehicle having a steering post and a steering wheel on said post of a switch device mounted on said steering post and having means for manually closing an electric circuit, means for opening said circuit by turning of said wheel and independently of the angular position of the circuit opening means with respect to the axis of the post, and means for adjusting the circuit opening means to open said circuit for different arcs of rotation of the wheel, said adjusting means comprising an upstanding lip member carried by said manually closing means, and a plurality of notches of varying arcuate length carried by said circuit opening means and selectively engaged by said lip member.

9. In combination, a steering post, a rotatable steering wheel mounted thereon, a switch mounted on said post adjacent said wheel and including a plurality of resiliently mounted switch terminals, an insulating housing, contact means carried by said housing, said housing having a bifurcated end, a pivoted switch arm engageable in said end for selectively rotating said housing to engage said contact means and certain of said terminals, a cage engaging about said arm, and means engaged by said wheel for actuating said cage to disengage said certain terminals.

10. In combination, a steering column having a rotatable steering wheel mounted thereon, a switch of the class described mounted on said column below said wheel and including a pivoted switch arm, spring means for rocking said arm axially of said pivot, an indented guide member limiting the pivotal movement of said arm, the indented portion of said member cooperating with said spring means to hold said arm in neutral position, and cage means engaged by said wheel pivoted coaxially of said arm and operable upon rotation of said wheel to return said arm to neutral position.

11. In combination, a steering column having a rotatable steering wheel mounted thereon, a switch of the class described mounted on said column and including a pivoted switch arm, spring means for rocking said arm axially of said pivot, an indented guide member limiting the pivotal movement of said arm, the indented portion of said member cooperating with said spring means to hold said arm in neutral position, and cage means engaged by said wheel and pivoted coaxially of said arm, said cage means being operable upon rotation of said wheel to return said arm to neutral position, said cage means being inoperative to remove said arm from neutral position.

12. In combination, a steering column having a rotatable steering wheel mounted thereon, a switch of the class described mounted on said column and including a switch housing having a cylindrical recess therein, plungers projecting from the bottom of said recess, conductors electrically connected to said plungers, an insulating carrier rotatable in said recess, a pivot member extending axially through said recess, a switch arm pivoted thereabout and engaging in said carrier, contacts embedded in the lower surface of said carrier and engageable with said plungers upon rotation of said arm out of normal position, said arm being rockable axially of said pivot member, latch means limiting rotational movement of said arm, cage means coaxial with said arm and engaging thereabout for returning said arm to normal position, and friction means engaged by said wheel and operable upon rotation of said wheel to rotate said cage means.

13. In combination, a steering column having a rotatable steering wheel mounted thereon, a switch secured to said column and including a plurality of switch contacts, a rotatable housing having means for electrically connecting selected contacts, friction means for rotating said housing to disconnect said contacts, comprising a radially flanged cup-shaped housing, a friction ring disposed thereabout, a plate secured thereover for preventing displacement of said ring, a second housing frictionally engaged within said cup-shaped housing, means engaged by rotation of said second housing for rotating said rotatable housing, and means carried by said wheel for rotating said friction ring.

14. In combination, a steering column, a steering wheel rotatably mounted thereon, a switch secured to said column and including a rotatable carrier having means for selectively engaging a plurality of switch contacts, an actuator for said carrier extending outwardly therefrom, cage means engaging said actuator, friction means for rotating said cage means including a member having a plurality of arcuate notches of varying length therein, a lip on said cage means, means for selectively engaging said lip in one of said notches, the length of said notch determining the arc of rotation of said friction means necessary for actuation of said cage means, and means carried by said wheel for rotating said friction means.

15. A switch adapted to cooperate with the steering apparatus of a vehicle, comprising a switch housing, contact means in said housing including a rotatable bridging member, means for automatically rotating said bridging member into inoperative position upon predetermined rotation of said steering apparatus, and means carried by and rotatable with said bridging member for selecting the amount of rotation desired in said steering apparatus before actuation of said bridging member, comprising a circular plate member having a plurality of arcuate slots of varying lengths therein, and upstanding lip means rotatably actuated by said steering apparatus and selectively engageable in one of said slots.

JOHN F. PAGENDARM.